United States Patent
Bayley et al.

(10) Patent No.: US 8,983,081 B2
(45) Date of Patent: Mar. 17, 2015

(54) SYSTEMS AND METHODS FOR LOGGING ACOUSTIC INCIDENTS

(75) Inventors: Antony M W Bayley, Wootton Baasett (GB); Ian Dobie, Swindon (GB)

(73) Assignee: Plantronics, Inc., Santa Cruz, CA (US)

( * ) Notice: Subject to any disclaimer, the term of this patent is extended or adjusted under 35 U.S.C. 154(b) by 1448 days.

(21) Appl. No.: 11/732,361

(22) Filed: Apr. 2, 2007

(65) Prior Publication Data

US 2008/0240450 A1 Oct. 2, 2008

(51) Int. Cl.
*H04R 29/00* (2006.01)
*G01H 3/14* (2006.01)

(52) U.S. Cl.
CPC ...................................... *G01H 3/14* (2013.01)
USPC ......................................................... 381/56

(58) Field of Classification Search
CPC .......... H04R 25/70; H04R 3/00; H04R 3/005; H04R 1/1083; H04R 1/1016; H04R 1/1041; H04R 2420/07; H04R 2430/01; H04R 25/50; H04R 25/505
USPC ........ 381/56, 71.1–71.8, 71.14, 72, 356, 355, 381/150, 94.1–94.3; 379/1.01–35, 67.1–87, 379/386, 391, 392, 392.01
See application file for complete search history.

(56) References Cited

U.S. PATENT DOCUMENTS

| | | | | | |
|---|---|---|---|---|---|
| 5,155,760 | A | * | 10/1992 | Johnson et al. | 379/88.01 |
| 5,608,804 | A | * | 3/1997 | Hirano | 381/71.12 |
| 5,642,428 | A | * | 6/1997 | Nowack | 381/107 |
| 6,507,650 | B1 | * | 1/2003 | Moquin | 379/387.01 |
| 6,826,515 | B2 | * | 11/2004 | Bernardi et al. | 702/191 |
| 7,395,090 | B2 | * | 7/2008 | Alden | 455/557 |
| 8,243,940 | B2 | * | 8/2012 | Smith | 381/67 |
| 2006/0063568 | A1 | * | 3/2006 | Mickle et al. | 455/572 |
| 2006/0147049 | A1 | * | 7/2006 | Bayley et al. | 381/56 |
| 2008/0037797 | A1 | * | 2/2008 | Goldstein et al. | 381/56 |

FOREIGN PATENT DOCUMENTS

| | | |
|---|---|---|
| CA | 2515558 A1 | 2/2007 |
| GB | 2349466 A1 | 11/2000 |
| WO | 03067202 A1 | 8/2003 |

OTHER PUBLICATIONS

International Searching Authority: European Patent Office. International Search Report, PCT/US2008/058131. Mar. 2009.
International Searching Authority: European Patent Office. Written Opinion of the International Searching Authority, PCT/US2008/058131. Mar. 2009.

* cited by examiner

*Primary Examiner* — Lun-See Lao

(57) ABSTRACT

Systems and methods for logging acoustic incidents. An exemplary system includes a transducer configured to receive an electrical signal from an electrical signal source and produce a corresponding acoustic signal, a recording system operable to record the electrical signal from the electrical signal source, and an incident estimation and control system coupled to the recording system to estimate an acoustic incident and to instruct the recording system to record the electrical signal that is producing the acoustic incident. The system can replay the recorded electrical signal through the same transducer that was in use at the time of the acoustic incident, to exactly reproduce the sound that occurred.

19 Claims, 7 Drawing Sheets

SYSTEMS AND METHODS FOR LOGGING ACOUSTIC INCIDENTS

FIELD OF THE INVENTION

The present invention relates generally to methods and apparatus for monitoring acoustic incidents. More particularly the present invention relates to methods and apparatus for logging headset-related acoustic incidents and recreating the incident for subsequent analysis.

BACKGROUND OF THE INVENTION

In a work environment, the accumulated amount of noise, or dose in terms of an average noise level, and the maximum level of noise to which an individual has been exposed during a workday are important to occupational safety and to the health of the individual. Industrial and governmental agencies in countries throughout the world, such as the Occupational Safety and Health Administration (OSHA) in the United States, require accurate noise data measurements.

Examples of such noise data measurements include impulse noise, continuous noise, and an eight-hour time-weighted average ("TWA"). Impulse noise relates to noise of very short duration, less than a few thousandths of a second, which also repeats less than once a second. Continuous noise relates to noise that is longer in duration than impulse noise, e.g., extending over seconds, minutes, or hours. Eight-hour TWA relates to the average of all levels of impulse and continuous noise to which an employee is exposed during an eight-hour workday. The OSHA maximum level for impulse noise is 140 dBSPL measured with a fast peak-hold sound level meter ("dBSPL" stands for sound pressure level, or a magnitude of pressure disturbance in air, measured in decibels, a logarithmic scale). The maximum level for continuous noise is 115 dBA (read on the slow average "A" scale). OSHA regulations limit an eight-hour TWA to 90 dBA. If employees are exposed to eight-hour TWAs between 85 and 90 dBA, OSHA requires employers to initiate a hearing conservation program which includes annual hearing tests.

Among the many noise sources that are encountered in the workplace, measuring the exposure to noise related to telephone headsets is especially problematic. Telephone headsets generate their sound levels at or in the user's ear canal rather than external to the user. The external sound field levels referred to in many governmental regulations cannot be directly compared to these headset sound levels.

Also, headset users in the workplace typically have jobs requiring either that they spend a substantial amount of time on the phone, or that their hands be free to perform other tasks. Since the headset user's speaker is held in or against the user's ear, the user requires more time to respond to any irritating tones or noises by moving the speaker further away from the ear than one typically does with a regular telephone handset. Accordingly, workers can be exposed to sounds which may be irritating and even very loud. Such exposure is referred to in the art as "acoustic incidents."

Claims of acoustic incidents by agents using headset equipment are investigated or defended by a number of actions which may include the measurement and examination of the telephone apparatus that was being used, the testimony of expert witnesses, and reference to recognized standards.

Some telephone equipment today may record agents' calls, but there is no calibrated reference level that allows someone examining an acoustic incident claim to determine the sound pressure level to which the agent was exposed. The sound pressure level to which the agent was exposed cannot be determined from a recording of the acoustic incident because conventional telephone call recordings are made not at the headset capsule interface but further back in the network path without any calibrated reference level being available for the recording. The result is that any recording may not actually represent what the agent heard, since it omits some of the signal chain/apparatus where the incident could have occurred (e.g., the telephone set, headset amplifier and headset), and since there is no reference to an absolute acoustic level.

A proposed solution to this problem is described in U.S. Pat. No. 6,507,650 to Moquin, entitled "Method for Noise Dosimetry in Appliances Employing Earphones or Headsets". The Moquin patent discloses a system that estimates the sound pressure level within the headset amplifier, and records the estimate in a database. Sound pressure level is estimated by passing the audio waveform through a "system modeling filter," which has a frequency response that models the transfer functions of the amplifier output stage, headset, artificial ear and A-weighting curve. Unfortunately, this estimation process is subject to inherent inaccuracies, has significant measurement error at some frequencies, and is unlikely to bear scrutiny by an expert witness skilled in acoustical measurements.

There is a need, therefore, for headset audio incident logging systems and methods that are more accurate and reliable than systems and methods available in the prior art.

BRIEF SUMMARY OF THE INVENTION

Methods and systems for logging, or recording, acoustic incidents created by an electrical signal source such as a telephone are disclosed. An exemplary method includes monitoring the electrical signal from the source and determining when an acoustic incident may be occurring based on mathematical estimation techniques. When an acoustic incident is determined to possibly be occurring, the electrical signal from the electrical signal source is recorded, or logged, along with other associated data. Thereafter the acoustic incident can be replicated by transmitting the recorded electrical signal to a transducer, which can be the same transducer which received the electrical signal during the acoustic incident.

Further features and advantages of the present invention, as well as the structure and operation of the above-summarized and other exemplary embodiments of the invention, are described in detail below with respect to accompanying drawings, in which like reference numbers are used to indicate identical or functionally similar elements.

DETAILED DESCRIPTION

Embodiments of the present invention are described herein. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
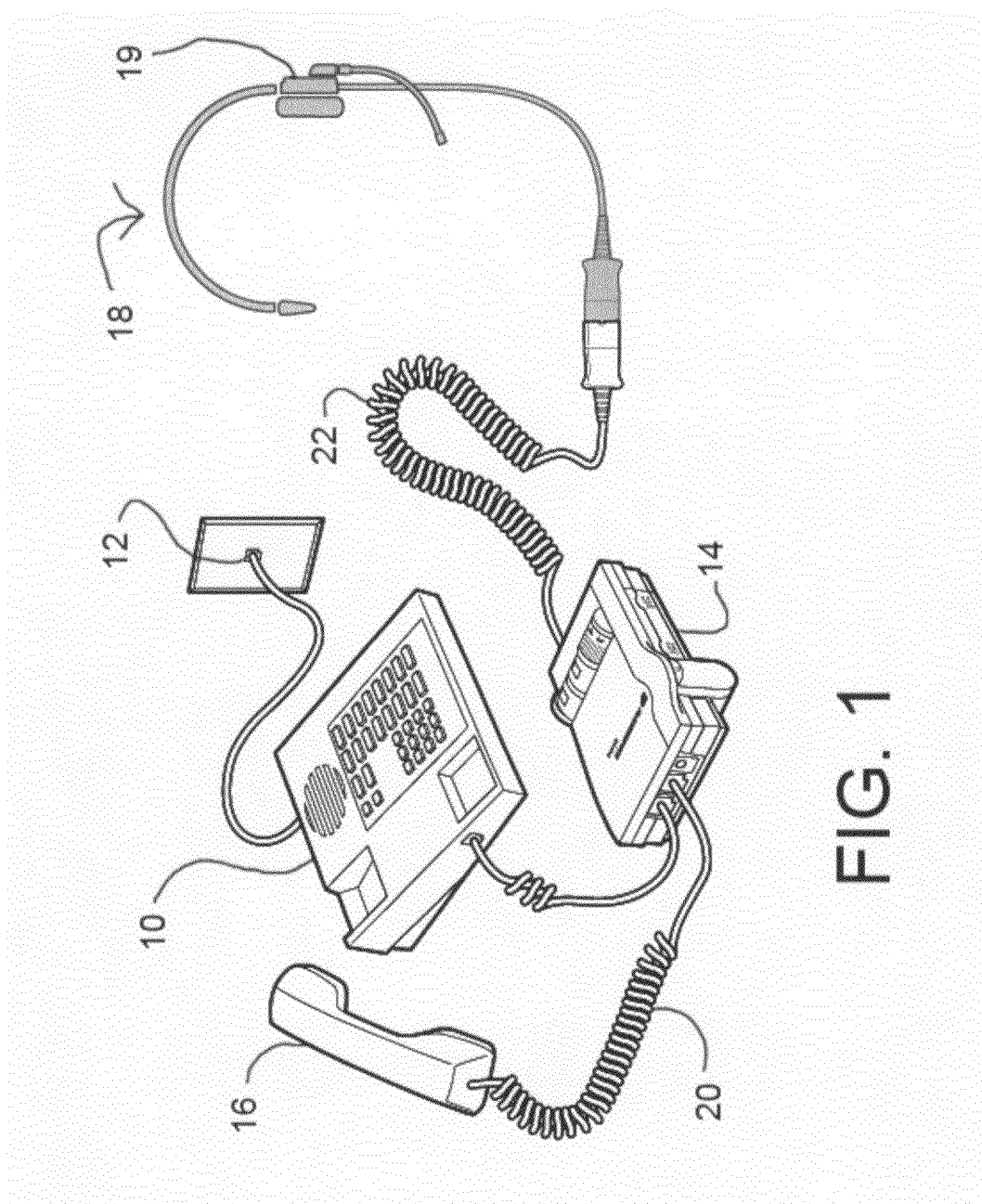
FIG. 1 is a drawing of a telephone system that includes an acoustic incident logging system, in accordance with an embodiment of the present invention.

FIG. 1 illustrates a telephone system including a telephone 10 which receives signals from a public switched telephone network (PSTN), private branch exchange (PBX) or IP telephone network through a wall plug 12. The telephone 10 is connected to an amplifier 14 which in turn sends electrical signals to a handset 16 and a headset 18 by cables 20 and 22, respectively. According to an embodiment of the invention, an acoustic incident logging system, which is described in detail below, is included in the amplifier 14. The headset 18 includes an electro-acoustic transducer 19, which converts electrical signals to corresponding acoustic signals. It should be recognized that this description above illustrates a wired headset connection, but a similar example utilizing a wireless headset connection could also be implemented.

Figure 2:
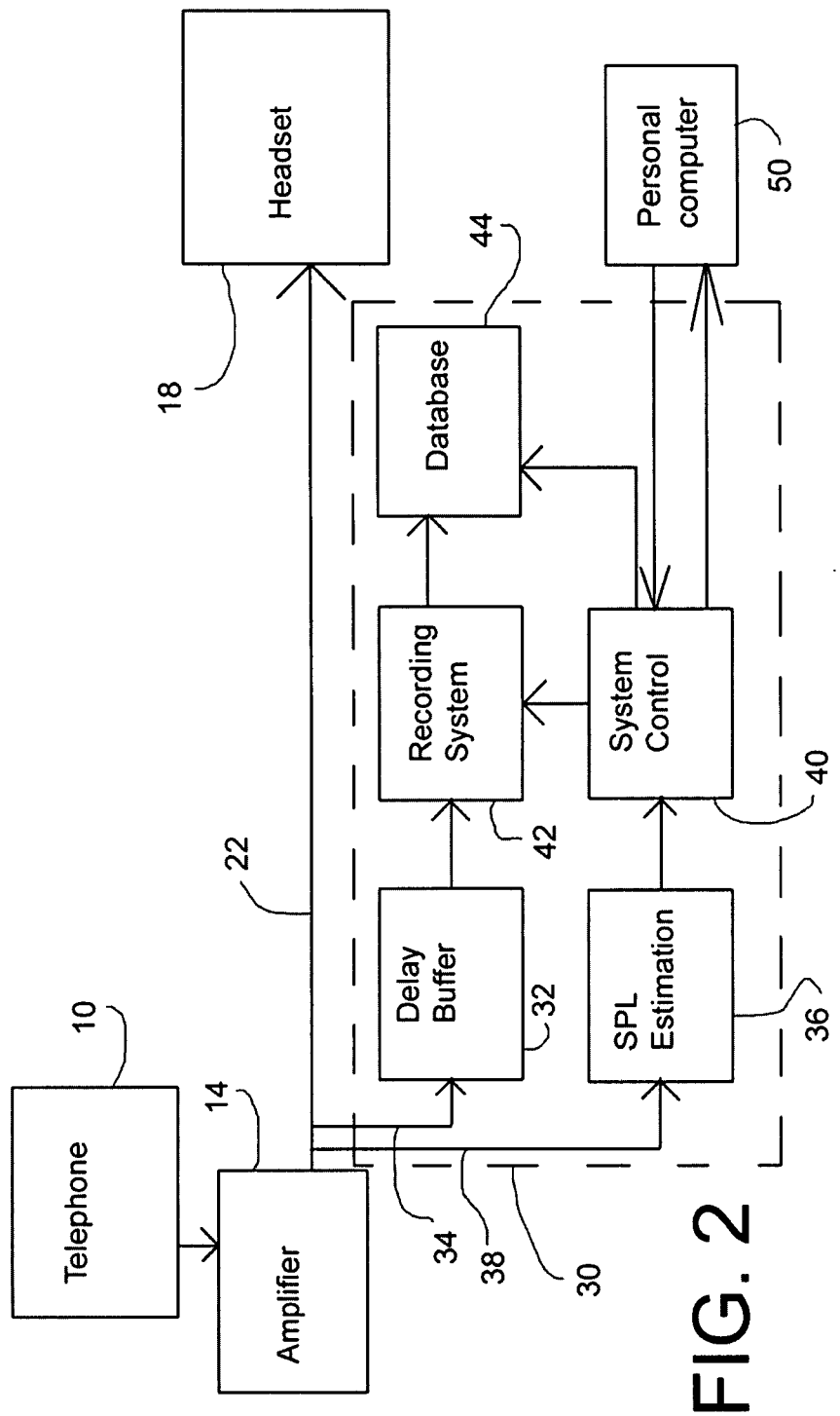
FIG. 2 is a schematic, block diagram of an exemplary acoustic incident logging system, in accordance with an embodiment of the present invention.

FIG. 2 is a block diagram of an acoustic incident logging system, in accordance with an embodiment of the present invention. The acoustic incident logging system 30 comprises a delay buffer 32 connected by line 34 to receive the same electrical signals from the amplifier 14 as the headset 18 is receiving from the amplifier 14. The function of the delay buffer 32 is to store the received signal for a short time and transmit the delayed signal to recording system 42. A sound pressure level (SPL) estimator 36 is connected by line 38 to receive the same electrical signals from the amplifier 14 as the headset 18 is receiving from the amplifier 14.

The SPL estimator 36 processes the electrical signal from the amplifier 14 to estimate the sound pressure level that the electrical signal generates at the eardrum reference point (DRP) of a user who is using the headset 18. The SPL estimator 36 uses a system modeling filter whose transfer function models the electroacoustic transmission properties of the headset 18 and the user's ear. A SPL estimation technique that may be used to implement the SPL estimator 36 is described in sections [0037] to [0047] and FIGS. 2-4 of U.S. Patent Application Publication No. 20060147049 to Bayley et al., entitled "Sound Pressure Limiter with Anti-Startle Feature", which is hereby incorporated by reference.

The SPL estimator 36 is configured to send signals to an incident detection and system control device 40. When the estimated sound pressure level exceeds a predetermined threshold, the incident detection and system control device 40 determines that an acoustic incident is in progress. Optionally, features other than the absolute sound pressure level (for instance the presence of a sudden increase of sound pressure level) may be used as the trigger that initiates recording of an acoustic incident. In an alternative data logging application the presence of particular words or phrases may form the acoustic incident trigger, if the system includes speech-recognition capabilities, and the context in which the words were uttered would be determined by recording audio for the period directly before and after the utterance.

The incident detection and system control device 40 is configured to control a recording system 42. When the incident detection and system control device 40 determines that an acoustic incident is beginning, the device 40 causes recording system 42 to initiate recording of the electrical signal which the recording is receiving from the delay buffer 32. The period of recording includes a configurable time period before the start of the acoustic incident, implemented by the delay buffer 32 and a configurable time period after the end of the acoustic incident, under the control of the incident detection and system control device 40.

The recording system 42 is coupled to a database system 44, and the recording system 42 periodically downloads the information which it has stored to the database system 44, and the data is erased from the recording system 42. Hence, a record of all electrical signals generating acoustic incidents occurring during a predetermined time period is maintained on the database system 42.

The acoustic incident detection and system control device 40 measures the duration and estimated maximum sound level which are occurring at the headset. At the end of the acoustic incident these are written to the database system 44 where they are associated with the electrical waveform recording, the current time and date, and any other data that are required.

Optionally, a personal computer (PC) 50 may be coupled to the acoustic incident logging system 30. User interface software on the personal computer 50 allows a user to control the incident logging system 30, including, for example, the following functions:

viewing acoustic incident records from the database system 44 on the screen of the personal computer 50;
    archiving database records on external storage media; and
    configuring acoustic incident threshold, recording time, and other operating parameters of the system.

If the PC 50 is permanently coupled to the acoustic incident logging system 30, the identity of the user and their workstation may be available, from the user's PC login and the PC's NetBIOS ID or MAC address respectively. This data may be included in the acoustic incident records stored in the database 44, to identify who was exposed to the acoustic incident and what equipment they were using. Optionally, a permanently-attached PC may implement some or all of the functionality of the acoustic incident logging system 30 and playback system 60 (see FIG. 3 below).

Figure 3:
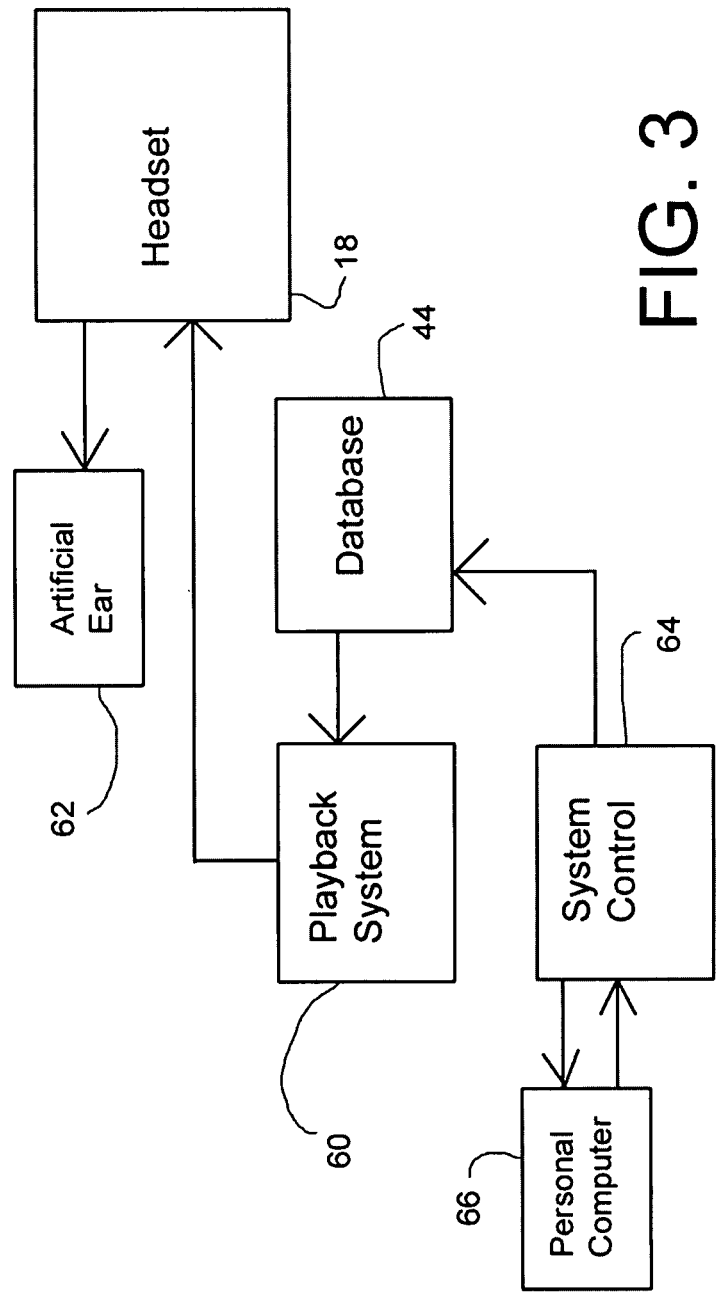
FIG. 3 is schematic, block diagram of a exemplary system for replaying an acoustic incident, in accordance with an embodiment of the present invention.

After an acoustic incident has been recorded as discussed above, the acoustic incident can be replayed using the system illustrated in schematic, block form in FIG. 3. The system includes the database system 44 on which is stored data comprising a copy of the electrical signal which generated the acoustic incident, and a playback system 60 is connected to receive signals from the database system 44. The playback system 60 is connected to drive the headset 18, and an artificial ear 62 receives acoustic signals from the headset 18. A system control device 64 is connected to the database system 44 and to the playback system 60 to control their operation. Optionally, a personal computer 66 can be connected to the system control device 62 to permit a user to control the system and receive data therefrom.

Those of ordinary skill in the art will readily appreciate and understand that the functional blocks in FIGS. 2 and 3 may or may not all be within the same physical device and may be implemented in different ways. For example, some or all of them could be implemented within the headset amplifier 14, in stand-alone hardware, or in software or firmware.

Figure 4:
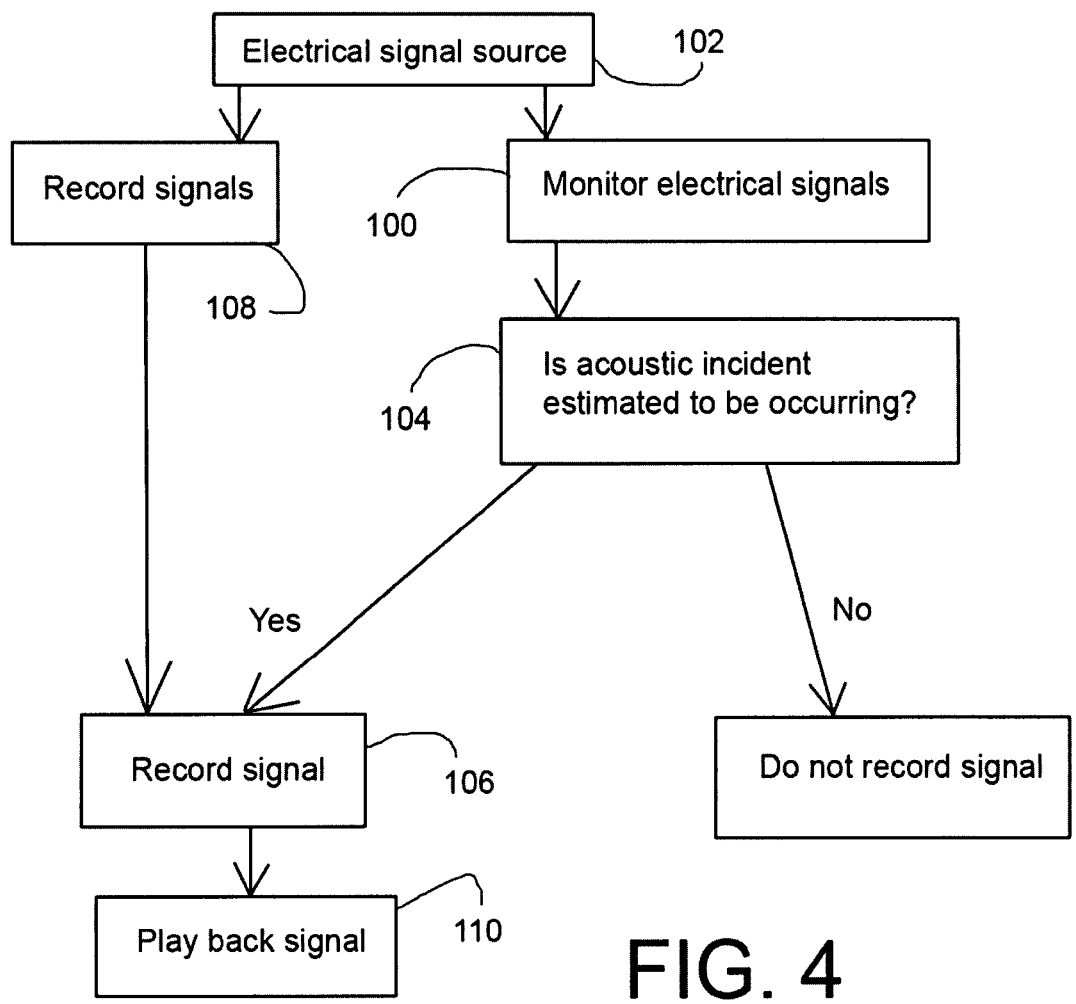
FIG. 4 is a flow diagram illustrating steps in an exemplary acoustic incident logging process, in accordance with an embodiment of the present invention.
Figure 5:
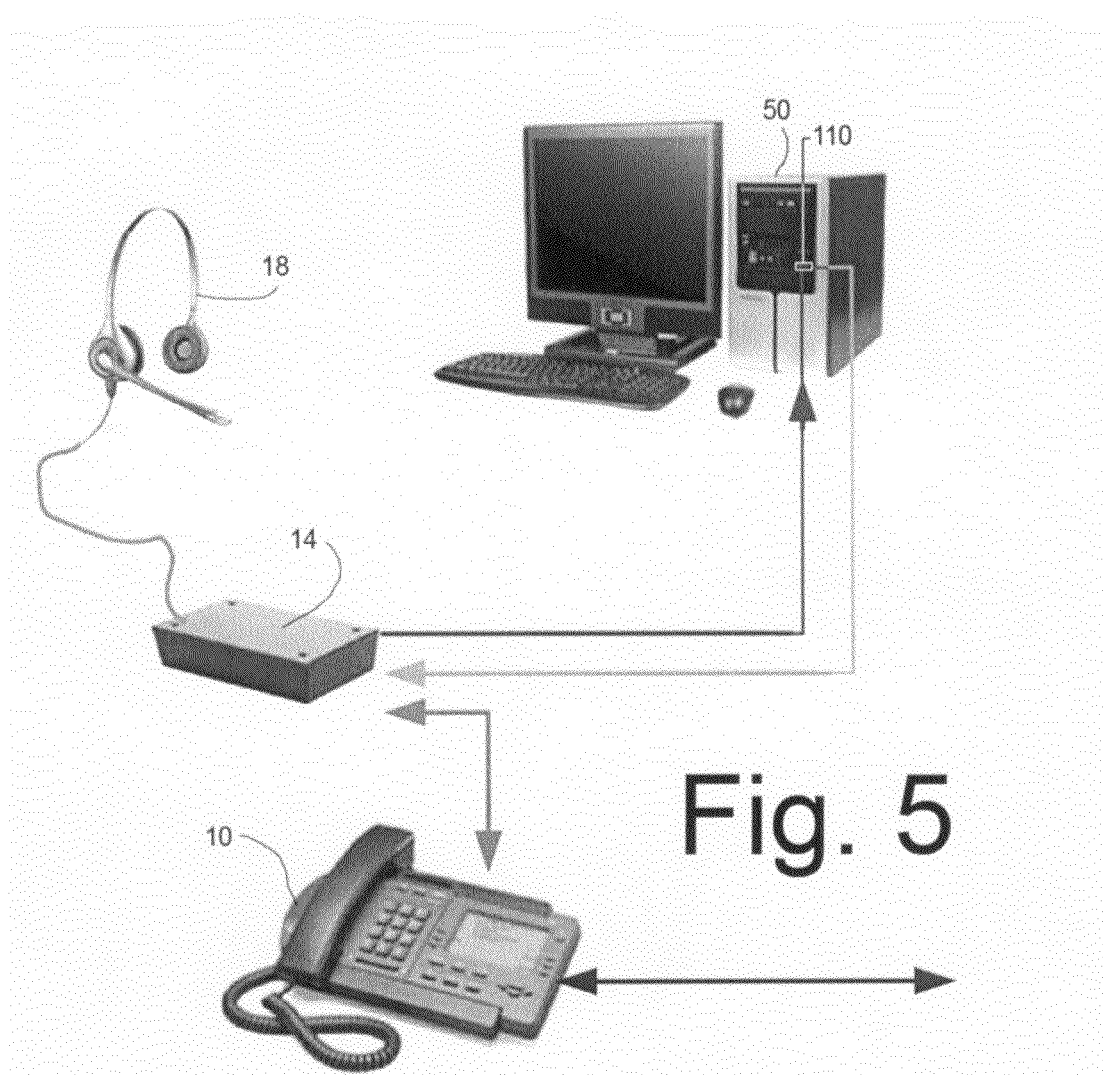
FIG. 5 is an illustration of an exemplary acoustic incident logging system, in accordance with an embodiment of the present invention.

Operation of the present embodiment can now be understood with reference to flow diagram in FIG. 4. Initially, in step 100, the acoustic incident logging system 30 monitors electrical signals from a source 102, e.g. an amplifier 14 connected to a telephone 10. The electrical signals are the same signals which are driving the electro-acoustic transducer of a headset 18. In step 104 the acoustic incident logging system 30 determines whether an acoustic incident may be occurring, based on a sound pressure level estimation. If it is determined that an acoustic incident may be occurring, e.g. based on whether a predetermined threshold has been exceeded, the acoustic incident logging system 30 records the electrical signal during the time that the acoustic incident is estimated to be occurring and optionally for a short period after the incident ceases (Step 106). Thereafter, in step 110 the recorded electrical signal is played back, and playback can be done using the same headset 18 which was being used when the acoustic incident occurred. The acoustic signal from the headset 18 can be measured by an artificial ear 62 to quantify the sound level and make calibrated sound pressure level measurements.

Optionally, the time during which the electrical signal is being recorded can begin shortly before the acoustic incident by continuously recording and temporarily storing the signals with the delay buffer 32 (step 108).

If the headset amplifier 14 uses digital signal processing, more accurate data logging may be implemented by recording the digital signal at some point within the amplifier's signal processing chain, instead of recording the analog voltage at the amplifier's output. In this embodiment the acoustic incident would be replayed by inserting the recorded digital samples at the same point in the amplifier's signal processing chain from which they were recorded, and playback can be done using the same headset 18 and the same amplifier 14 that were being used at the time of the incident.

Thus it can be understood that if an agent who is using a headset asserts that he or she was exposed to excessive sound levels from the headset, the present system can be used to confirm or refute the agent's claim by exactly reproducing the sound to which they were exposed during the acoustic incident.

Turning now to FIGS. 5-9, an alternative embodiment is illustrated. A headset amplifier 14 is connected to a PC 50 via a USB port 110, which powers the amplifier and provides bi-directional data communications. The headset amplifier 14 contains the SPL estimation block 36 and part of the system control block 40 shown in FIG. 2: specifically, the estimated SPL is compared with the chosen acoustic incident threshold, and signals are sent to the PC 50 to indicate the start and end of an acoustic incident. All the other functional blocks of the acoustic incident logging system 30 shown in FIG. 2 are implemented in the PC 50.

At the input of the headset amplifier 14, the telephone speech is converted to a sampled digital data stream with an analog to digital converter (ADC), not shown. Within the amplifier digital signal processing is used to implement the required audio processing. The processed digital data are then converted back to an audio voltage waveform by means of a digital to analog converter (DAC) and fixed-gain power amplifier, not shown. The digital audio data at the DAC input are continuously streamed via the USB interface to the PC, where they enter the delay buffer 32. The remaining system control 40 functionality, the recording system 42 and the database 44 are all implemented on the PC. The database is stored on the PC's hard disk or on a network folder to achieve non-volatile data storage, with automatic back-ups if required.

The entire playback system of FIG. 3 is implemented in PC software. When the user selects an acoustic incident record from the database 44 and chooses to play it back, the system controller 64 activates the playback system 60. The playback system streams the recorded digital audio data via the USB interface to the headset amplifier, where it drives the DAC input. The DAC and fixed-gain power amplifier drive the headset 18, and recreate the sound that occurred during the acoustic incident at precisely the same level as the original incident. During playback the sound pressure level of the acoustic incident can be accurately measured with a calibrated artificial ear 62 and its associated instrumentation.

Figure 6:
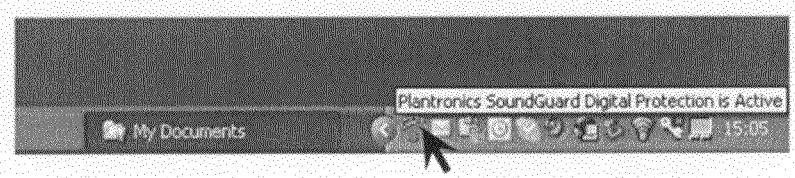
FIG. 6 is a screen-shot of a PC screen's system tray (bottom right of the screen) that illustrates an exemplary user-interface of the acoustic incident logging system of FIG. 5, in accordance with an embodiment of the present invention.

In the present embodiment, the PC software that performs acoustic incident recording runs as a service or application that is automatically loaded when the PC boots up. Incidents are recorded automatically, with no user intervention. The user-interface comprises a system-tray icon to indicate that the software is running, and a pop-up message to identify the icon's meaning when the PC's mouse pointer moves over the icon. FIG. 6 is a screen-shot of the PC screen's system tray (bottom right of the screen), to illustrate this user-interface.

Optionally there may be a means of manually activating an acoustic incident recording, such as by right-clicking the system tray icon or using a specific function key or key sequence on the PC's keyboard. This may have applications as a memo-pad for important information that was discussed during the phone call, for a call-centre agent to record abusive callers, etc. Manually triggered recordings, like the automatic recordings, could record audio from a few seconds before the activation trigger to ensure that vital information is not missed.

Acoustic incidents can be viewed and played back using an administrator application running on a PC. Acoustic incident databases can be accessible via the network to an administrator with sufficient login privileges, so the records associated with any workstation or employee can be viewed remotely.

Figure 7:
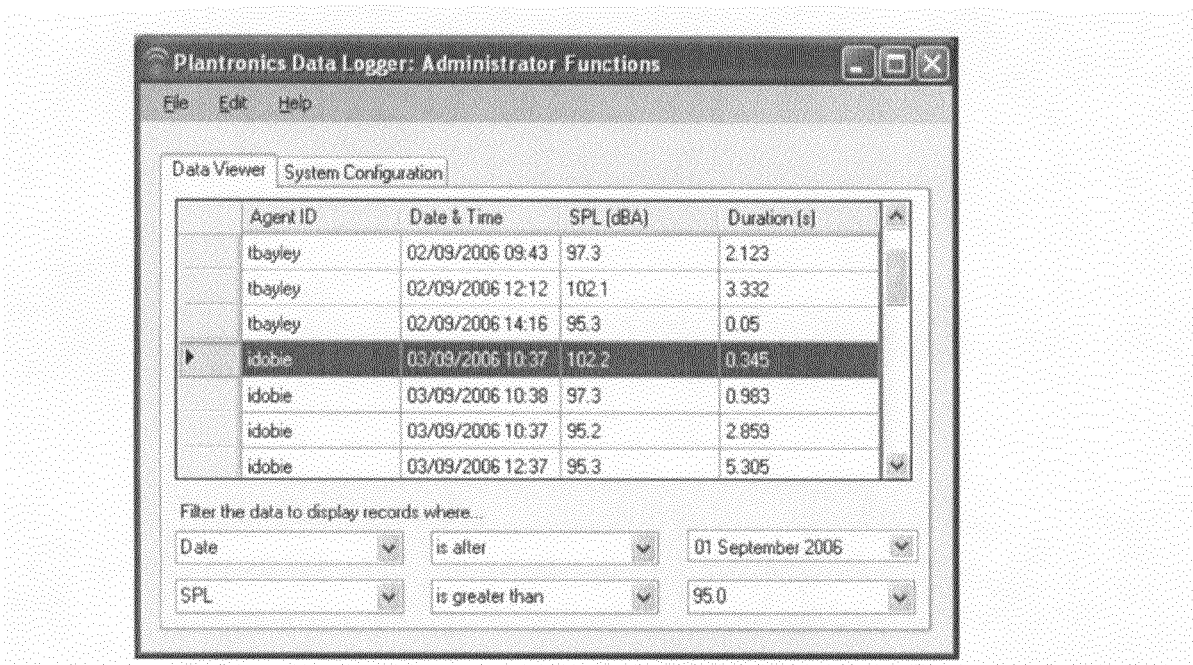
FIG. 7 is a screen-shot of a PC screen's initial view presented to an administrator that illustrates an exemplary user-interface of the acoustic incident logging system of FIG. 5, in accordance with an embodiment of the present invention.

The initial view presented to the administrator is a table displaying the database contents, shown in FIG. 7. Brief details of each incident record are displayed, and the controls at the bottom of the window allow filters to be applied to any of the fields in the incident record (time/date, user ID, etc) to help locate the required incident record.

Figure 8:
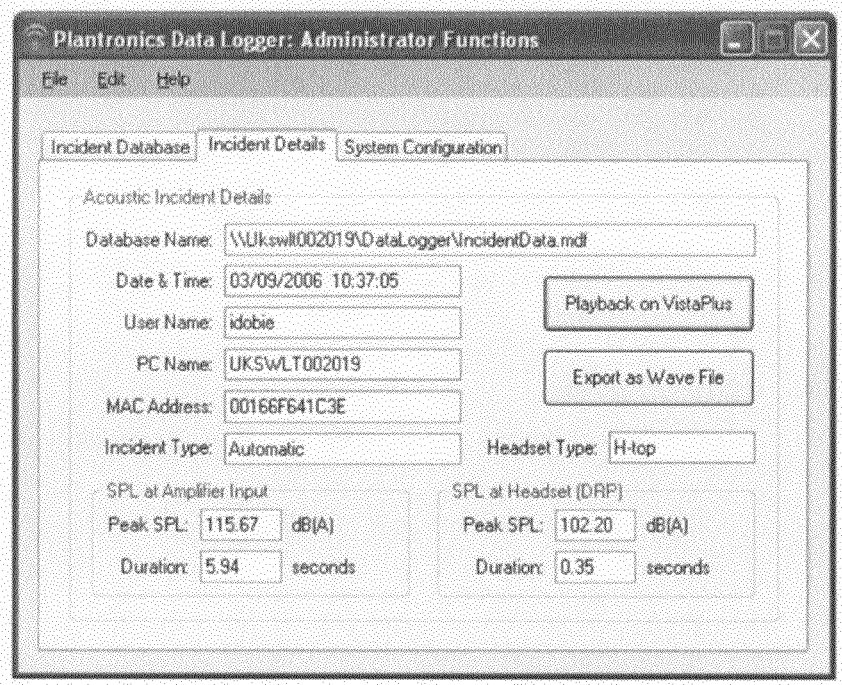
FIG. 8 is another screen-shot of the PC screen's view presented to an administrator that illustrates an exemplary user-interface of the acoustic incident logging system of FIG. 5, in accordance with an embodiment of the present invention.

Double-clicking on an incident record or selecting an incident and switching to the Incident Details tab displays further data as shown in FIG. 8. All the data associated with the acoustic incident record are displayed. The incident type is identified as "Automatic", which means that it was triggered by the sound pressure level thresholding system. Manually-requested recordings as discussed above have the incident type set to "Requested".

In this instance the headset amplifier contains a sound pressure level limiter. When limiting is active the amplifier attenuates the sound level. During an incident the amplifier estimates the maximum SPL at the headset, and also the SPL that would have occurred without limiting (the field identified as "SPL at Amplifier Input"). Both of these values are transmitted to the database along with the durations for which the input and output sound levels exceeded the chosen acoustic incident threshold.

If a headset amplifier and headset of the VistaPlus type manufactured by Plantronics, Inc. are connected to the PC via the USB interface, the "Playback on VistaPlus" button is enabled, and pressing it plays back the recorded audio through the headset.

By pressing the "Export as Wave File" button the audio can be stored as a standard wave file, so that it can be played back on any media player. A standard media player would not be able to reproduce the exact sound level that occurred during the acoustic incident, but would enable subjective assessment of the incident.

Figure 9:
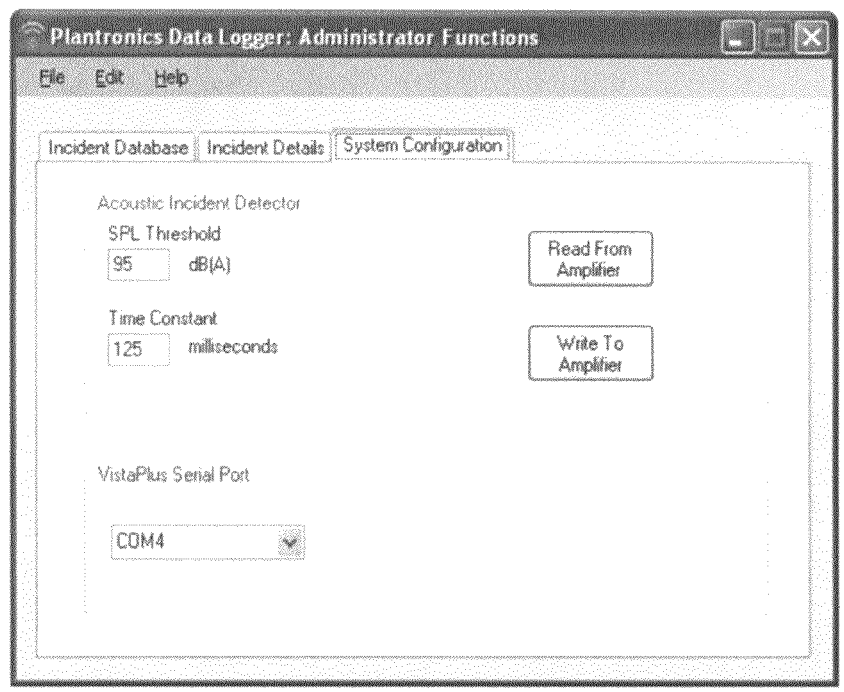
FIG. 9 is another screen-shot of the PC screen's view presented to an administrator that illustrates an exemplary user-interface of the acoustic incident logging system of FIG. 5, in accordance with an embodiment of the present invention.

The final tab of the administrator application, shown in FIG. 9, allows system configuration. In the present embodiment the time constant of the SPL estimation process and the acoustic incident detection threshold are both configurable. The USB interface uses a virtual COM port, hence the serial port configuration. In some cases these details may be hidden from the user.

Alternatively, the system can be configured to allow direct playback of audio on the PC's loudspeaker from the Administrator software application. This, like playback of an exported wavefile, would only enable subjective assessment of an acoustic incident, but may be useful when deciding whether more detailed analysis is necessary.

As well as playing back acoustic incidents, the system can be configured to analyze them on the PC. For instance if the headset's receiving sensitivity frequency response is known, it is possible to calculate the sound pressure level at the eardrum reference point (DRP), or at some other acoustic reference point, at any instant in time during the recorded acoustic incident.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. Accordingly, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. An apparatus comprising:
a sound pressure level estimator configured to estimate a sound pressure level based on an electrical signal;
an incident detection and system control device configured to determine that an acoustic incident is in progress responsive to the sound pressure level exceeding a predetermined threshold; and
a recording system configured to record the electrical signal, while the acoustic incident is in progress, responsive to the incident detection and system control device determining that the acoustic incident is in progress.

2. The apparatus of claim 1, further comprising:
an amplifier configured to produce the electrical signal.

3. The apparatus of claim 1, further comprising:
a delay buffer configured to delay the electrical signal prior to the recording system recording the electrical signal.

4. The apparatus of claim 1, further comprising:
a transducer configured to produce an acoustical signal based on the electrical signal.

5. The apparatus of claim 4, further comprising:
a headset comprising the transducer.

6. The apparatus of claim 5, wherein:
the sound pressure level estimator is further configured to estimate the sound pressure level at an eardrum reference point of a user wearing the headset.

7. The apparatus of claim 1, wherein the sound pressure level is a first sound pressure level, and wherein the apparatus further comprises:
a playback system configured to play back the electrical signal recorded by the recording system;
a transducer configured to produce an acoustical signal based on the electrical signal played back by the playback system; and
an artificial ear configured to measure a second sound pressure level of the acoustical signal.

8. The apparatus of claim 1, further comprising:
a database configured to maintain a record of the electrical signal recorded by the recording system; and
a computer configured to provide an identity of a user of a computer;
wherein the database is further configured to include the identity of the user in the record.

9. A method comprising:
estimating a sound pressure level based on an electrical signal;
determining that an acoustic incident is in progress responsive to the sound pressure level exceeding a predetermined threshold; and
recording the electrical signal, while the acoustic incident is in progress, responsive to determining that the acoustic incident is in progress.

10. The method of claim 9, further comprising:
producing the electrical signal.

11. The method of claim 9, further comprising:
delaying the electrical signal prior to recording the electrical signal.

12. The method of claim 9, further comprising:
producing an acoustical signal based on the electrical signal.

13. The method of claim 12, wherein:
estimating the sound pressure level at an eardrum reference point of a user hearing the acoustical signal.

14. The method of claim 9, wherein the sound pressure level is a first sound pressure level, and wherein the method further comprises:
playing back the electrical signal that was recorded;
producing an acoustical signal based on the electrical signal being played back; and
measuring a second sound pressure level of the acoustical signal.

15. The method of claim 9, further comprising:
maintaining, in a database, a record of the recorded electrical signal;
providing an identity of a user of a computer; and including the identity of the user in the record in the database.

16. Non-transitory computer-readable media embodying instructions executable by a computer to perform functions comprising:
   estimating a sound pressure level based on an electrical signal;
   determining that an acoustic incident is in progress responsive to the sound pressure level exceeding a predetermined threshold; and
   recording the electrical signal, while the acoustic incident is in progress, responsive to determining that the acoustic incident is in progress.

17. The non-transitory computer-readable media of claim 16, wherein the functions further comprise:
   delaying the electrical signal prior to recording the electrical signal.

18. The non-transitory computer-readable media of claim 16, wherein the functions further comprise:
   estimating the sound pressure level at an eardrum reference point of a user hearing an acoustical signal, wherein the acoustical signal is produced by a transducer based on the electrical signal.

19. The non-transitory computer-readable media of claim 16, wherein the functions further comprise:
   maintaining, in a database, a record of the recorded electrical signal;
   providing an identity of a user of the computer; and
   including the identity of the user in the record in the database.

* * * * *